United States Patent
Kobayashi et al.

[11] Patent Number: 5,658,546
[45] Date of Patent: Aug. 19, 1997

[54] DENITRATION CATALYST

[75] Inventors: Motonobu Kobayashi; Noboru Sugishima; Katsunori Miyoshi, all of Himeji, Japan

[73] Assignee: Nippon Shokubai Co., Ltd., Osaka, Japan

[21] Appl. No.: 522,536

[22] Filed: Sep. 1, 1995

Related U.S. Application Data

[63] Continuation of Ser. No. 282,595, Jul. 29, 1994, abandoned.

[30] Foreign Application Priority Data

Jul. 30, 1993 [JP] Japan ............... 5-190206

[51] Int. Cl.$^6$ .............. B01J 21/06; C01B 21/00
[52] U.S. Cl. .............. 423/239.1; 502/302; 502/303; 502/304; 502/309
[58] Field of Search .............. 502/302, 303, 502/304, 309; 423/235, 239.1

[56] References Cited

U.S. PATENT DOCUMENTS

| | | | |
|---|---|---|---|
| 4,085,193 | 4/1978 | Nakajima et al. | 502/309 |
| 4,269,737 | 5/1981 | Grenoble et al. | 502/309 |
| 4,466,947 | 8/1984 | Imanari et al. | 502/309 |
| 4,833,113 | 5/1989 | Imanari et al. | 502/309 |
| 4,916,107 | 4/1990 | Brand et al. | 502/309 |
| 5,300,472 | 4/1994 | Brand et al. | 502/309 |

FOREIGN PATENT DOCUMENTS

| | | | |
|---|---|---|---|
| 518989 | 11/1955 | Canada | 502/309 |
| 87487 | 7/1976 | Japan | 502/309 |
| 76289 | 6/1977 | Japan | 502/309 |
| 5235342 | 9/1977 | Japan . | |
| 25290 | 3/1978 | Japan | 502/309 |
| 11093 | 1/1979 | Japan | 502/309 |
| 193733 | 11/1983 | Japan | 502/309 |
| 114808 | 3/1989 | Japan . | |

*Primary Examiner*—Wayne Langel
*Attorney, Agent, or Firm*—Sherman and Shalloway

[57] ABSTRACT

There is provided a denitration catalyst excellent in denitration activity and durability in a high temperature region, for catalytically reducing NOx in an exhaust gas using a reducing agent such as ammonia. This denitration catalyst is (1) one containing a titanium-tungsten oxide obtained by coprecipitating a soluble titanium compound and a soluble tungsten compound from an aqueous medium under the conditions of a temperature of 60° C. or less and a pH of the range of 5 to 8, and drying and calcining to coprecipitate formed; or (2) one comprising said titanium-tungsten oxide (component A), and an oxide of at least one element (component B) selected from the group consisting of cerium (Ce), lanthanum (La), praseodymium (Pr), neodymium (Nd), nickel (Ni) and tin (Sn).

2 Claims, No Drawings

DENITRATION CATALYST

This application is a continuation of application Ser. No. 08/282,595, filed Jul. 29, 1994, abandoned.

This invention relates to a denitration catalyst. More detailedly, this invention relates to a denitration catalyst suitable for catalytically reducing nitrogen oxides (hereinafter, referred to as "NOx") contained in high temperature exhaust gases discharged from gas turbines, boilers, Diesel engines, etc. and further various industrial processes, using ammonia, or a solid compound forming ammonia by its decomposition, for example urea, melamine, cyanuric acid, ammonium carbonate, ammonium bicarbonate or the like.

The "denitration catalyst" of this invention means a catalyst for converting NOx in exhaust gases to harmless nitrogen and water by catalytically reducing it using the above reducing agent.

As processes for removing NOx in exhaust gases, a catalytic reduction process using ammonia as a reducing agent is now chiefly performed. The reason is that in the process, NOx can selectively be removed even from exhaust gases containing oxygen in high concentrations, and only a small amount of the reducing agent is sufficient for the purpose and thus the process is economical.

As catalysts used for this catalytic reduction process, many catalysts have been proposed wherein alumina, silica, zeolite, titanium oxide or the like is combined with an oxide of vanadium, copper, tungsten, molybdenum, iron or the like. Among them, catalysts containing titanium oxide as a main component are now widely put to practical use, since these catalysts are not affected by sulfur oxides (SOx), and have only the low ability to oxidize $SO_2$ in exhaust gases to $SO_3$. The reaction temperatures are usually on the order of 250° to 400° C.

As processes for preparing such a catalyst containing titanium oxide as a main component, there are known, for example a process which comprises adding an aqueous solution of a soluble tungsten compound to titanium hydroxide precipitate gel obtained by adding ammonia water to an aqueous solution of a soluble titanium compound, and mixing the mixture, followed by molding, drying and calcination; a process which comprises molding matter obtained by previously heating part or all of a catalyst mixture for molding to convert it to an oxide, and drying and calcinating the resultant molding (Japanese Patent Publication No. 35342/1977); and a process which comprises making a metatitanate precipitate obtained by thermal hydrolysis of a titanium sulfate solution solate, adding a tungsten compound, and then calcining, molding, drying and calcining the mixture (Japanese Patent Publication No. 14808/1989).

On the other hand, denitration catalysts to exhibit excellent activities over a comparatively broad temperature region are often required for removing NOx from exhaust gases having a temperature as high as over 400° C., for example gas turbine exhaust gases and Diesel engine exhaust gases.

However, catalysts containing titanium oxide and tungsten oxides as main components, described in the above Japanese Patent Publication No. 35342/1977, exhibit the highest catalytic activity at a temperature of 400° C., and the de-NOx efficiency lowers at 500° C., as shown in Example 1 of the official gazette. It is considered to heighten the mole ratio of ammonia to NOx for enhancing the de-NOx efficiency, but under a condition where ammonia excessively exists, consumption of ammonia increases, economical efficiency lowers, and further, there is a danger that a large amount of ammonia leaks into the exhaust gas at the time of load change.

Namely, denitration catalysts which have so far been known, when used for catalytic reduction of NOx in exhaust gases having high temperatures exceeding 400° C., have a drawback that the de-NOx efficiency is low because oxidation (or decomposition) reaction of ammonia as a reducing agent occurs at the same time with reduction of NOx. These catalysts exhibit high de-NOx efficiencies when the mole ratio of ammonia to NOx is enlarged, but on the other hand, disadvantages and inconveniences as mentioned above are brought about due to increase of consumption of ammonia. In addition, these catalysts had a problem in durability at high temperatures.

The object of this invention is to provide a denitration catalyst having high practicability which exhibits a high denitration activity and has excellent durability, over a broad temperature region, particularly over a high temperature region exceeding 400° C., further even under low ammonia/NOx mole ratios.

The present inventors found that the above object can be accomplished, in obtaining a titanium-tungsten oxide by precipitating a soluble titanium compound and a soluble tungsten compound from an aqueous medium, and drying and calcining the precipitate, by performing this precipitation operation under specific conditions, and completed this invention based on this finding.

Thus this invention provides (1) a denitration catalyst containing a titanium-tungsten oxide obtained by coprecipitating a soluble titanium compound and a soluble tungsten compound in an aqueous medium under the conditions of a temperature of 60° C. or less and a pH in the range of 5 to 8, and drying and calcining the coprecipitate formed; and (2) a denitration catalyst comprising the above titanium-tungsten oxide, and an oxide of at least one element selected from the group consisting of cerium (Ce), lanthanum (La), praseodymium (Pr), neodymium (Nd), nickel (Ni) and tin (Sn).

This invention is more detailedly described below.

There is no particular limitation about the kind of soluble titanium compounds used in this invention, so long as they are soluble in aqueous media. Preferred examples of these titanium compounds are inorganic titanium compounds such as titanium tetrachloride and titanyl sulfate, and organotitanium compounds such as titanium oxalate and tetraisopropyl titanate. There is no particular limitation about the kind of soluble tungsten compounds, either, and for example, ammonium metatungstate, ammonium paratungstate, etc. can preferably be used. It is preferable for giving a highly active denitration catalyst that the rate between the soluble titanium compound and the soluble tungsten compound is such a rate that the weight ratio of titanium oxide/tungsten oxide ($TiO_2/WO_3$, as is the same hereinafter) after calcination comes under the range of 20/1 to 1/1, particularly 20/1 to 1.5/1.

Water is usually used as the aqueous medium.

A so far known method such as a thermal hydrolysis method, a thermal decomposition method or a neutralization method using a basic compound can be used for coprecipitating a soluble titanium compound and a soluble tungsten compound dissolved in an aqueous medium. A particularly preferred method is a method comprising coprecipitating titanium and tungsten by the neutralization method. There is no particular limitation about the kind of these basic compounds, and examples of them are ammonia, sodium hydroxide, potassium hydroxide, sodium carbonate, potassium carbonate, etc. Ammonia or an aqueous solution thereof (ammonia water) is preferably used among them in view of washability and handling properties of the slurry (or gel)-like matter formed by the coprecipitation operation.

Thus this invention is specifically described below taking as an example a method which comprises causing the coprecipitation using water as the aqueous medium and ammonia water as the basic compound.

First, a soluble titanium compound (e.g., titanium tetrachloride) and a soluble tungsten compound (e.g., ammonium metatungstate) are dissolved in water to prepare an acidic titanium-tungsten-containing aqueous solution. Ammonia water is then added so that the pH of the system comes under the range of 5 to 8, preferably 5 or more and under 7, while the temperature of the aqueous solution is maintained to be 60° C. or less, preferably in the range of 50° to 0° C., to form a coprecipitate. When an aqueous solution of a tungsten compound is alkaline, the tungsten-containing aqueous solution and ammonia water are simultaneously added to a titanium-containing aqueous solution to form a coprecipitate.

The pH of the above system means the pH of the slurry (or gel)-like matter at the point of time when the coprecipitation operation was complete.

When the temperature during the coprecipitation operation goes beyond 60° C., the activity of the denitration catalyst obtained is, undesirably, lowered. When the final pH is lower than 5, the activity of the denitration catalyst obtained is, undesirably, lowered, and when the final pH is higher than 8, the activity of the denitration catalyst is, undesirably, lowered, and moreover redissolution of tungsten also takes place.

The titanium-tungsten coprecipitate obtained by the above coprecipitation operation is separated from the slurry, sufficiently washed, dried and then calcined to give a titanium-tungsten oxide. The above separation, washing, drying and calcination can be performed under conditions generally used for preparation of these kinds of catalysts. The calcination is preferably performed at a temperature of the range of 400° to 750° C., particularly 450° to 700° C., under such a condition that the weight ratio of titanium oxide/tungsten oxide becomes 20/1 to 1/1, particularly 20/1 to 1.5/1. The temperature range was preferred for better durability. There can be used as to the calcination operation any of $\hat{1}$ a method comprising drying, calcining and then molding the titanium-tungsten coprecipitate, $\hat{2}$ a method comprising molding and then calcining the titanium-tungsten coprecipitate, and $\hat{3}$ a method where the above method $\hat{1}$ and the method $\hat{2}$ are combined. Since shrinkage of the molding, change of catalytic properties, etc. sometimes take place by the calcination treatment in the case of the method $\hat{2}$, the method $\hat{1}$ or the method $\hat{3}$ is preferable. It is preferable in the case of the method $\hat{3}$ to perform the calcination in the latter stage at the same temperature as in the calcination in the former stage, or at a temperature lower than that.

The reason why the denitration catalyst comprising the titanium-tungsten oxide of this invention exhibits an excellent denitration activity and has excellent durability is not clear, but is surmised to be that tungsten oxide as the active ingredient is dispersed in a highly dispersed state in titanium oxide in the denitration catalyst obtained when the precipitation is performed under the above specific conditions.

A denitration catalyst wherein the above titanium-tungsten oxide (hereinafter referred to as "component A") is combined with an oxide of at least one element selected from the group consisting of cerium (Ce), lanthanum (La), praseodymium (Pr), neodymium (Nd), nickel (Ni) and tin (Sn) (hereinafter referred to as "component B") exhibits a further excellent denitration activity. The weight ratio of component A/component B is preferably in the range of 400/1 to 10/1, particularly 300/1 to 10/1. When the weight ratio is above 400/1, the effect of addition of component B is not obtained, and when the weight ratio is under 10/1, the activity at high temperatures lowers and durability also lowers.

There is no particular limitation about a compound used as a raw material of component B used at the time of preparation of a denitration catalyst comprising the above component A and component B, and any of oxides, hydroxides, ammonium salts, oxalate salts, halides, sulfate salts, nitrate salts, etc. can be used. For example, the denitration catalyst can be prepared by adding an aqueous solution of the nitrate salt of a component B element and a molding auxiliary, etc. are added to titanium-tungsten oxide powder obtained in the above manner; mixing, kneading and molding the mixture; drying the molding at 50° to 200° C.; and then calcining the dried molding in the air at a temperature of 400° to 700° C. for 1 to 10 hours, preferably 2 to 6 hours.

The denitration catalyst of this invention can also be used in combination with alumina; silica; zirconia; titania; a composite oxide such as titania-silica; zeolite containing silica and alumina in specific ratios; or the like.

The denitration catalyst of this invention can be used as it is after integral molding, or can be used in a state carried on a carrier. Usable carriers include alumina; silica; composite oxides such as silica-alumina and titania-silica; bentonite; diatom earth; silicon carbide; titania; zirconia; magnesia; cordierite; mullite; pumice; inorganic fibers; plates or nets of metals such as stainless steel; etc. There is no particular limitation about carriage methods, and there can, for example, be used a carriage method comprising impregnating granular silicon carbide with slurry of the denitration catalyst, a carriage method comprising coating a stainless steel corrugated sheet with slurry of the denitration catalyst, etc.

There is no particular limitation about the shape of the denitration catalyst (including a carriage-carried catalyst), and any of honeycomb, tabular, cylindrical, ribbon, pipe, doughnut, lattice, column, corrugated sheet and granular shapes, etc. can be adopted.

When the surface area of the denitration catalyst of this invention is too low, the denitration activity is low, and when it is too high, decomposition of ammonia is accelerated, and therefore the surface area of the denitration catalyst is selected from the range of 10 to 120 m$^2$/g, preferably 15 to 100 m$^2$/g. When the pore volume of the denitration catalyst of this invention is too low, the denitration activity is low, and when it is too high, the catalytic strength is lowered, and therefore the pore volume of the denitration catalyst is selected from the range of 0.1 to 0.6 cc/g, preferably 0.2 to 0.5 cc/g.

There is no particular limitation about the composition of exhaust gases to be treated by the denitration catalyst of this invention, and the denitration catalyst of this invention can be used for treatment of various exhaust gases containing Nox, for example for treatment of exhaust gases containing, roughly, 0 to 3000 ppm of SOx, 1 to 20 vol % of oxygen, 1 to 15 vol % of carbon dioxide, 5 to 15 vol % of steam, 0.001 to 30 g/Nm$^3$ of soot and dust, and 20 to 10,000 ppm of NOx (chiefly NO). The denitration catalyst of this invention can also be used for treatment of special exhaust gases, for example Nox-containing exhaust gases not containing SOx, Nox-containing exhaust gases containing halogen compounds, etc.

Conditions of treatment of exhaust gases using the denitration catalyst of this invention cannot sweepingly be specified, since they vary depending on kinds and properties of exhaust gases, de-NOx efficiency required, etc., but can appropriately be determined considering these conditions.

Usable reducing agents include ammonia, and compounds forming ammonia by decomposition, e.g. urea, melamine, cyanuric acid, ammonium carbonate, ammonium bicarbonate, etc. Preferably used are ammonia in view of handling properties and costs, and urea in view of safety. Although the forms of the reducing agents at the time of injection into exhaust gases are not particularly limited, it is preferable, in view of dispersibility of the reducing agents in the exhaust gases, to inject them in the forms of gas or liquids such as ammonia gas, liquid ammonia, ammonia water, aqueous urea solutions, aqueous ammonium carbonate solutions and aqueous ammonium bicarbonate solutions. When a reducing agent forming ammonia by decomposition is used, the addition amount of the reducing agent is determined based on the amount of ammonia formed from the reducing agent, and for example half the molar amount of ammonia in the case of urea and 1/3 the molar amount of ammonia in the case of melamine.

The use amount of ammonia as a reducing agent can appropriately be selected from the range of 0.3/1 to 3/1, preferably 0.3/1 to 1.5/1 as an ammonia/NOx (in terms of NO) mole ratio, taking a de-NOx efficiency, the amount of leak ammonia, etc. into account. Particularly, in the case of the denitration catalyst of this invention, high de-NOx efficiencies can be obtained even in the range of the ammonia/NOx (in terms of NO) mole ratio being 1.5/1 or less, and thus NOx can efficiently be decomposed and removed. For example, in the case of treatment of exhaust gases from boilers, since most of NOx contained in these exhaust gases in NO, the ammonia/NOx (in terms of NO) mole ratio is particularly preferably around 1, but can appropriately be selected from the order of 2/1 or less, taking a de-NOx efficiency required, the amount of leak ammonia, etc. into account.

The reaction temperature is preferably 400° to 700° C., particularly 450° to 650° C. The space velocity is in the range of usually 1,000 to 100,000 $Hr^{-1}$, particularly preferably 3,000 to 80,000 $Hr^{-1}$. There is no particular limitation about pressure, but usually, the pressure is preferably in the range of 0.01 to 10 $kg/cm^2$.

There is no particular limitation about the form of reactors used for treatment of exhaust gases, either, and usual reactors can be used such as fixed bed, moving bed and fluid bed reactors.

This invention is further specifically described below according to examples.

EXAMPLE 1

11.4 kg of titanium tetrachloride ($TiCl_4$) was gradually added dropwise for dissolution to 80 liters (hereinafter referred to as L) of water under ice cooling and stirring, and 2.4 kg of an aqueous ammonium metatungstate solution (containing 50 wt % of tungsten oxide) produced by Nippon Mukikagaku Kogyo Co., Ltd. was added to the resultant aqueous solution. While the resultant aqueous solution was maintained at a temperature of about 30° C. and sufficiently stirred, ammonia water was added until the pH of the system became 6, and the mixture was left as it was for 2 hours for aging.

The thus obtained titanium-tungsten coprecipitate-containing slurry was filtered, and the obtained titanium-tungsten coprecipitate was washed, dried at 150° C. for 10 hours, and calcined at 600° C. for 5 hours to give a titanium-tungsten oxide having titanium oxide/-tungsten oxide=4/1 (weight).

1 kg of the above titanium-tungsten oxide powder was sufficiently kneaded using a kneader while an appropriate amount of water was added, and then molded into pellets of diameter 4 mm and length 5 mm. These pellets were then dried at 60° C. and calcined at 600° C. for 5 hours under an air stream to give a catalyst (A) having titanium oxide/tungsten oxide=4/1 (weight).

EXAMPLE 2

80 L of water was added to 19.2 L of an aqueous sulfuric acid solution of titanyl sulfate (250 g/L in terms of $TiO_2$). While this aqueous solution was maintained at a temperature of about 30° C. and stirred, an aqueous solution obtained by adding 1.35 kg of ammonium paratungstate to a mixture of 0.54 kg of monoethanolamine with 2.7 L of water, and ammonia water were gradually added dropwise thereto, ammonia water was successively added until the pH of the system became 6, and the mixture was left as it was for 2 hours for aging. Then, the mixture was treated in the same manner as in Example 1 to prepare a catalyst (B) having the same composition.

EXAMPLES 3 to 7

The same operations as in Example 1 were performed except that the titanium oxide/tungsten oxide weight ratio in Example 1 was changed, to prepare catalysts (C) to (G). The compositions of the catalysts are as listed in Table 1.

TABLE 1

| Example | Kind of catalyst | Composition (wt %) | | $TiO_2/WO_2$ (weight ratio) |
| --- | --- | --- | --- | --- |
| | | $TiO_2$ | $WO_3$ | |
| 3 | (C) | 99 | 1 | 99/1 |
| 4 | (D) | 95 | 5 | 19/1 |
| 5 | (E) | 70 | 30 | 2.3/1 |
| 6 | (F) | 50 | 50 | 1/1 |
| 7 | (G) | 40 | 60 | 0.67/1 |

Comparative Example 1

An aqueous solution obtained by adding 1.35 kg of ammonium paratungstate to a mixture of 0.54 kg of monoethanolamine with 2.7 L of water was added to 4.8 kg of commercially available anatase-type titanium oxide powder (DT-50 produced by Rhone-Poulenc Co.), and the mixture was sufficiently mixed and kneaded using a kneader while an appropriate amount of water was added. The mixture was then treated in the same manner as in Example 1 to prepare a comparative catalyst (a) having the same composition as in Example 1.

The above catalysts (A) to (G) are those prepared using soluble titanium compounds as titanium sources, whereas the comparative catalyst (a) is one prepared using the above insoluble titanium oxide as a titanium source.

Comparative example 2

An aqueous solution obtained by adding 1.35 kg of ammonium paratungstate to a mixture of 0.54 kg of monoethanolamine with 2.7 L of water was added to slurry of metatitanic acid (4.8 kg in terms of $TiO_2$); the mixture was kneaded with heating in a kneader; and the resultant slurry was dried at 150° C. for 10 hours and calcined at 600° C. for 5 hours to give powder having the same composition as in Example 1. The powder was treated in the same manner as in Example 1 to prepare a comparative catalyst (b) having the same composition as in Example 1.

The above catalysts (A) to (G) are those prepared using soluble titanium compounds as titanium sources, whereas the comparative catalyst (b) is one prepared using the above sparingly soluble metatitanic acid.

Assessment example 1

De-NOx efficiencies were determined according to the following method on each catalyst of the catalysts (A) to (G) and the comparative catalysts (a) and (b) obtained Examples 1 to 7 and Comparative examples 1 and 2, respectively.

20 ml of a catalyst was packed into a quartz-made reaction tube installed inside an electric furnace, a synthetic gas having the following composition was introduced into the catalyst layer under the following conditions. The NOx concentration in the gas at the inlet of the reaction tube (inlet NOx concentration) and the NOx concentration in the gas at the outlet of the reaction tube (outlet NOx concentration) were measured using a chemiluminescence-type NOx meter (Model ECL-77A) produced by Yanagimoto Seisakusho Co., and the de-NOx efficiency was calculated according to the following equation.

$$\text{De-NOx efficiency (\%)} = \frac{[\text{Inlet NO}_2 \text{ concentration}] - [\text{Outlet NO}_2 \text{ concentration}]}{[\text{Inlet Nox concentration}]} \times 100$$

Composition of synthetic gas

NOx=100 ppm, $O_2$=15%, $SO_2$=200 ppm, $H_2O$=10%, $N_2$ =residual

Reaction conditions

Gas amount=3.33 NL/min, Space velocity (SV)=10,000 $Hr^{-1}$, $NH_3$/NOx (in terms of NO) mole ratio=1.0, Temperature=300° to 700° C.

The resultant results are shown in Table 2.

TABLE 2

| Example | Kind of catalyst | De-NOx efficiency (%) Reaction temperature (°C.) | | | | |
|---|---|---|---|---|---|---|
| | | 300 | 400 | 500 | 600 | 700 |
| Example 1 | (A) | 82 | 88 | 90 | 84 | 77 |
| Example 2 | (B) | 85 | 89 | 90 | 83 | 76 |
| Example 3 | (C) | 77 | 81 | 83 | 80 | 70 |

TABLE 2-continued

| Example | Kind of catalyst | De-NOx efficiency (%) Reaction temperature (°C.) | | | | |
|---|---|---|---|---|---|---|
| | | 300 | 400 | 500 | 600 | 700 |
| Example 4 | (D) | 80 | 85 | 87 | 81 | 73 |
| Example 5 | (E) | 84 | 90 | 92 | 83 | 74 |
| Example 6 | (F) | 84 | 90 | 91 | 82 | 72 |
| Example 7 | (G) | 83 | 89 | 90 | 79 | 68 |
| Comparative example 1 | (a) | 72 | 78 | 80 | 75 | 65 |
| example 2 | (b) | 78 | 81 | 82 | 77 | 67 |

Assessment example 2

A de-NOx efficiency was determined on the catalyst (A) obtained in Example 1, in the same manner as in Assessment example 1 except that the $NH_3$/NOx (in terms of NO) mole ratio was changed. The amount of ammonia discharged (leak ammonia amount) was measured by an indophenol method described in JIS-K-0099. The resultant results are shown in Table 3.

TABLE 3

| $NH_3$ amount introduced (ppm) | $NH_3$/NOx (mole ratio) | Reaction temperature (°C.) | | | | | | | | |
|---|---|---|---|---|---|---|---|---|---|---|
| | | 300 | | 400 | | 500 | | 600 | | 700 | |
| | | α | β | α | β | α | β | α | β | α | β |
| 100 | 1.0/1 | 82 | 117 | 88 | 9 | 90 | 7 | 84 | 10 | 77 | 7 |
| 150 | 1.5/1 | 96 | 103 | 99 | 36 | 100 | 23 | 97 | 31 | 91 | 29 |
| 200 | 2.0/1 | 100 | 99 | 100 | 70 | 100 | 63 | 98 | 55 | 94 | 50 |

α: de-NOx efficiency (%)
β: leak ammonia amount (ppm)

EXAMPLE 8

The same operations as in Example 1 were performed except that the temperature at the time of the coprecipitation operation in Example 1 was changed from about 30° C. to 55° C., to prepare a catalyst (H) having the same composition.

EXAMPLE 9

The same operations as in Example 1 were performed except that the pH of the system at the time of the coprecipitation operation in Example 1 was changed from 6 to 5, to prepare a catalyst (I) having the same composition.

EXAMPLE 10

The same operations as in Example 1 were performed except that the pH of the system at the time of the coprecipitation operation in Example 1 was changed from 6 to 8, to prepare a catalyst (J) having the same composition.

Comparative example 3

The same operations as in Example 1 were performed except that the temperature at the time of the coprecipitation operation in Example 1 was exchanged from about 30° C. to 80° C., to prepare a comparative catalyst (c) having the same composition.

Comparative example 4

The same operations as in Example 1 were performed except that the pH of the system at the time of the coprecipitation operation in Example 1 was changed from 6 to 4, to prepare a comparative catalyst (d) having the same composition.

Comparative example 5

The same operations as in Example 1 were performed except that the pH of the system at the time of the coprecipitation operation in Example 1 was changed from 6 to 9.0, to prepare a comparative catalyst (e) having the same composition.

Comparative example 6

Titanium tetrachloride ($TiCl_4$) was mixed with ice water and the resulting solution was neutralized with aqueous ammonia solution. The thus obtained slurry was filtered and washed with distilled water. The resulting cake was mixed with paratungstate solution. The resulting slurry was dried and mixed with polyethylene oxide and water were added. The obtained mixture was milled in the wet state for 30 minutes, and molded as 1.5 mm diameter pellets. The molded pellets were dried and calcined at 500° C. for 5 hours. Titanium oxide/tungsten oxide atomic ratio of the resulting catalyst (f) was 9/1.

Assessment example 3

De-NOx efficiencies were determined in the same manner as in Assessment example 1 on the complete catalysts (H) to (J) and the comparative catalysts (c) and (e) obtained in Examples 8 to 10 and Comparative examples 3 and 5, respectively. The resultant results are shown in Table 4.

TABLE 4

| Example No. | Kind of catalyst | De-NOx efficiency (%) Reaction temperature (°C.) | | | | | Coprecipitation conditions | |
|---|---|---|---|---|---|---|---|---|
| | | 300 | 400 | 500 | 600 | 700 | Temperature (°C.) | pH |
| Example 8 | (H) | 84 | 88 | 89 | 84 | 78 | 55 | 6 |
| Example 9 | (I) | 83 | 88 | 90 | 83 | 77 | 30 | 5 |
| Example 10 | (J) | 82 | 87 | 89 | 82 | 75 | 30 | 8 |
| Comparative example 3 | (c) | 79 | 84 | 86 | 78 | 69 | 80 | 6 |
| example 4 | (d) | 78 | 83 | 85 | 76 | 63 | 30 | 4 |
| example 5 | (e) | 75 | 81 | 84 | 79 | 71 | 30 | 9 |

EXAMPLES 11 to 14

The same operations as in Example 1 were performed except that the temperatures of calcination of the titanium-tungsten coprecipitate in Example 1 were changed to temperatures shown in Table 5, to prepare catalysts (K) to (N) having the same composition, respectively.

Assessment example 4

De-NOx efficiencies were determined in the same manner as in Assessment example 1 on the catalysts (K) to (N) obtained in Examples 11 to 14, respectively. The resultant results are shown in Table 5.

TABLE 5

| Example | Calcination temperature (°C.) | Kind of catalyst | De-NOx efficiency (%) Reaction temperature (°C.) | | | | |
|---|---|---|---|---|---|---|---|
| | | | 300 | 400 | 500 | 600 | 700 |
| 11 | 400 | (K) | 87 | 89 | 87 | 76 | 67 |
| 12 | 450 | (L) | 85 | 90 | 91 | 83 | 75 |
| 13 | 700 | (M) | 84 | 86 | 86 | 82 | 73 |
| 14 | 750 | (N) | 76 | 80 | 81 | 76 | 66 |

EXAMPLES 15 to 25

Predetermined amounts of compounds of various elements were added to portions of the titanium tungsten oxide powder obtained in Example 1 so as to be the rates (in terms of oxides) shown in Table 6, respectively, and the mixtures were sufficiently kneaded using kneaders, respectively, while appropriate amounts of water were added. The resultant mixtures were then treated in the same manner as in Example 1 to prepare catalysts (O) to (Y) comprising the component A and the components B, respectively.

TABLE 6

| | | Composition ratio (weight %) | | | | | | | A/B |
|---|---|---|---|---|---|---|---|---|---|
| | Kind of | Component A | Component B | | | | | | weight |
| Example | catalyst | $TiO_2$—$WO_3$ | $CeO_2$ | $La_2O_3$ | $Pr_6O_{11}$ | $Nd_2O_3$ | NiO | SnO | ratio |
| 15 | (O) | 98 | 2 | 0 | 0 | 0 | 0 | 0 | 49/1 |
| 16 | (P) | 98 | 0 | 2 | 0 | 0 | 0 | 0 | 49/1 |
| 17 | (Q) | 98 | 0 | 0 | 2 | 0 | 0 | 0 | 49/1 |
| 18 | (R) | 98 | 0 | 0 | 0 | 2 | 0 | 0 | 49/1 |
| 19 | (S) | 98 | 0 | 0 | 0 | 0 | 2 | 0 | 49/1 |
| 20 | (T) | 98 | 0 | 0 | 0 | 0 | 0 | 2 | 49/1 |
| 21 | (U) | 96 | 2 | 2 | 0 | 0 | 0 | 0 | 24/1 |
| 22 | (V) | 96 | 2 | 0 | 0 | 0 | 2 | 0 | 24/1 |
| 23 | (W) | 99.8 | 0.2 | 0 | 0 | 0 | 0 | 0 | 49.9/1 |

TABLE 6-continued

| | | Composition ratio (weight %) | | | | | | | A/B |
|---|---|---|---|---|---|---|---|---|---|
| | Kind of | Component A | Component B | | | | | | weight |
| Example | catalyst | $TiO_2$—$WO_3$ | $CeO_2$ | $La_2O_3$ | $Pr_6O_{11}$ | $Nd_2O_3$ | NiO | SnO | ratio |
| 24 | (X) | 90 | 10 | 0 | 0 | 0 | 0 | 0 | 9/1 |
| 25 | (Y) | 90 | 0 | 0 | 0 | 0 | 10 | 0 | 9/1 |

EXAMPLE 26

The same operations as in Example 1 were performed to prepare catalyst (Z) except:

1. Ammonium paratungstate was used as a soluble tungsten compound.
2. Molded pellets (1.5 mm diameter) were dried and calcined at 500° C. for 5 hours.
3. Titanium oxide/tungsten oxide atomic ratio of the resulting catalyst (Z) was 9/1.

Assessment example 5

De-NOx efficiencies were determined in the same manner as in Assessment example 1 on the catalysts (O) to (Y) obtained in Examples 15 to 25. The resultant results are shown in Table 7.

TABLE 7

| | Kind of | De-NOx efficiency (%) Reaction temperature (°C.) | | | | |
|---|---|---|---|---|---|---|
| Example | catalyst | 300 | 400 | 500 | 600 | 700 |
| 15 | (O) | 88 | 91 | 92 | 87 | 80 |
| 16 | (P) | 85 | 90 | 92 | 86 | 79 |
| 17 | (Q) | 85 | 91 | 93 | 87 | 81 |
| 18 | (R) | 81 | 88 | 92 | 87 | 80 |
| 19 | (S) | 89 | 92 | 92 | 85 | 77 |
| 20 | (T) | 87 | 91 | 92 | 85 | 77 |
| 21 | (U) | 88 | 92 | 93 | 86 | 78 |
| 22 | (V) | 86 | 91 | 93 | 86 | 77 |
| 23 | (W) | 82 | 88 | 90 | 83 | 75 |
| 24 | (X) | 82 | 86 | 87 | 80 | 67 |
| 25 | (Y) | 86 | 88 | 86 | 76 | 65 |

Assessment example 6

Durabilities were assessed according to the following method on the catalysts (A), (E), (I), (M), (O) and (V) and the comparative catalysts (b) and (c) obtained in Examples 1, 5, 9, 13, 15 and 22 and Comparative examples 2 and 3, respectively.

These catalysts were placed in an electric furnace adjusted to 550° C., under an air stream, and taken out after the predetermined time lapses, respectively. Then, de-NOx efficiencies at a reaction temperature of 500° C. were measured in the same manner as in Assessment example 1, respectively. The resultant results are shown in Table 8.

TABLE 8

| | Kind of | De-NOx efficiency (%) Elapsed time (hrs) | | | |
|---|---|---|---|---|---|
| Example No. | catalyst | 0 | 2000 | 4000 | 6000 |
| Example 1 | (A) | 90 | 89 | 89 | 89 |
| Example 5 | (E) | 92 | 91 | 90 | 90 |
| Example 9 | (I) | 90 | 89 | 88 | 88 |
| Example 13 | (M) | 86 | 86 | 85 | 85 |
| Example 15 | (O) | 92 | 89 | 89 | 89 |
| Example 22 | (V) | 93 | 92 | 91 | 91 |
| Comparative example 2 | (b) | 82 | 75 | 72 | 70 |
| example 3 | (e) | 86 | 77 | 74 | 71 |

Assessment example 7

De-NOx efficiencies were determined in the same manner as in Assessment example 1 on the catalyst (Z) and the catalyst (f).

The results are shown in Table 9.

TABLE 9

| | Kind of | De-NOx efficiency (%) Reaction temperature (°C.) | | | | |
|---|---|---|---|---|---|---|
| Example | catalyst | 300 | 400 | 500 | 600 | 700 |
| Example 26 | (Z) | 81 | 86 | 88 | 83 | 75 |
| Comparative example 6 | (f) | 73 | 78 | 79 | 76 | 68 |

The denitration catalyst of this invention exhibits high denitration activities and has excellent durability, over a broad temperature region, particularly over a high temperature region of 400° C. or more. Thus, it is possible, by using the denitration catalyst of this invention, to efficiently decompose and remove NOx in high temperature exhaust gases discharged from gas turbines, boilers, gas engines, Diesel engines, etc. and further various industrial processes.

The denitration catalyst of this invention exhibits excellent denitration activities and durability over a broad temperature region, particularly over a high temperature region of 400° C. or more and even at low ammonia/NOx mole ratios. Thus, it is possible, by using the denitration catalyst of this invention, to efficiently decompose and remove NOx in high temperature exhaust gases with minimal consumption of ammonia, i.e. economically, and without causing problems such as leak of ammonia.

What we claim is:

1. A denitration catalyst, the catalytically active component thereof consisting essentially of the following component A or a mixture of the following component A and the following component B; said component A being a titanium-tungsten oxide obtained by coprecipitating a soluble titanium compound and a soluble tungsten compound from an aqueous medium at a temperature of 60° C. or less and a pH in the range of from 5 to 8, and drying and calcining the resulting coprecipitate; and component B is an oxide of at least one element selected from the group consisting of cerium, lanthanum, praseodymium, neodymium, nickel and tin.

2. In a process for removing nitrogen oxides from an exhaust gas containing said nitrogen oxides, using ammonia or a compound forming ammonia by its decomposition as a reducing agent and a denitration catalyst, the improvement comprising using a denitration catalyst as set forth in claim 30 as said denitration catalyst.

* * * * *

UNITED STATES PATENT AND TRADEMARK OFFICE
CERTIFICATE OF CORRECTION

PATENT NO. : 5,658,546
DATED : August 19, 1997
INVENTOR(S) : KOBAYASHI, ET AL.

It is certified that error appears in the above-indentified patent and that said Letters Patent is hereby corrected as shown below:

In column 14, claim 2, line 6, change "claim 30" to --claim 1--.

Signed and Sealed this

Twenty-sixth Day of May, 1998

BRUCE LEHMAN

*Attest:*

*Attesting Officer*            Commissioner of Patents and Trademarks